(12) United States Patent
Matsumoto

(10) Patent No.: US 10,345,943 B2
(45) Date of Patent: Jul. 9, 2019

(54) DISPLAY DEVICE

(71) Applicant: Japan Display Inc., Minato-ku (JP)

(72) Inventor: Yuko Matsumoto, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/986,140

(22) Filed: May 22, 2018

(65) Prior Publication Data

US 2018/0348934 A1   Dec. 6, 2018

(30) Foreign Application Priority Data

Jun. 1, 2017 (JP) .................. 2017-109330

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
CPC ......... G06F 3/0412; G06F 2203/04103; G06F 3/041
See application file for complete search history.

(56) References Cited

U.S. PATENT DOCUMENTS

| | | | | |
|---|---|---|---|---|
| 8,823,677 B2 * | 9/2014 | Huang | .................. | G06F 3/045 345/174 |
| 2003/0122800 A1 * | 7/2003 | Yu | .......................... | G02F 1/133 345/173 |
| 2013/0135256 A1 * | 5/2013 | Hong | ..................... | G06F 3/042 345/175 |
| 2014/0320441 A1 | 10/2014 | Yamada et al. | | |
| 2015/0060817 A1 | 3/2015 | Sato et al. | | |
| 2017/0222180 A1 | 8/2017 | Sato et al. | | |
| 2017/0249039 A1 * | 8/2017 | Kim | ..................... | G06F 3/0412 |

FOREIGN PATENT DOCUMENTS

| | | |
|---|---|---|
| JP | 2013-114659 | 6/2013 |
| JP | 2015-50245 | 3/2015 |

* cited by examiner

*Primary Examiner* — Alexander Eisen
*Assistant Examiner* — Mansour Said
(74) *Attorney, Agent, or Firm* — Oblon, McClelland, Maier & Neustadt, L.L.P.

(57) ABSTRACT

A circuitry layer includes a display area and a peripheral area outside the display area, the circuitry layer including display elements, the circuitry layer including first interconnects connected to the respective display elements. A touch sensing layer includes touch electrodes overlapped with the display area, the touch sensing layer including second interconnects overlapped with the peripheral area and connected to the respective touch electrodes. A spacer layer is interposed at least between the first interconnects and the second interconnects. Each touch electrode and a corresponding one of the display elements closest thereto are away from each other by a first distance in a thickness direction. Each second interconnect and a corresponding one of the first interconnects closest thereto are away from each other by a second distance in the thickness direction. The second distance is larger than the first distance.

7 Claims, 8 Drawing Sheets

DISPLAY DEVICE

CROSS-REFERENCE TO RELATED APPLICATION

The present application claims priority from Japanese application JP2017-109330 filed on Jun. 1, 2017, the content of which is hereby incorporated by reference into this application.

BACKGROUND

This relates to display devices.

Mobile devices such as smartphones have come to commonly be equipped with a touch censor (JP 2013-114659A). One proposal is a structure where touch electrodes and lead-out lines are on a sealing film of organic electroluminescence elements (JP 2015-050245A). The touch electrodes are in a display area and the lead-out lines are in a frame area outside the display area, minimizing effects against displaying performance.

The sealing film is made from an inorganic film with high gas barrier properties to prevent the organic electroluminescence elements from being deteriorated due to moisture or oxygen. An additional organic film is often laminated between inorganic films to improve coverage of the inorganic film by forming a flat surface over a foreign matter.

In the frame area, the inorganic layer surrounds the organic layer to prevent moisture intrusion and the sealing film is smaller in thickness than in a pixel region because no organic layer is provided in the frame area. Another organic layer, which is to provide a flat surface over an uneven surface of a circuitry layer, is removed in a part of the frame area, to prevent moisture intrusion and to form a moisture cut-off structure. The moisture cut-off structure has a smaller thickness, by at least the two organic layers, than in the display area.

Providing the lead-out lines of the touch censor in the frame area may lead to increase in capacity because the lead-out lines are close to electrodes or interconnect lines in the circuitry layer, raising a problem of lower sensitivity (S/N ratio) of the touch censor.

This is to aim at preventing lower sensitivity of the touch censor.

SUMMARY

A display device may include a circuitry layer including a display area and a peripheral area outside the display area, the circuitry layer in the display area including display elements for image display, the circuitry layer in the peripheral area including first interconnects connected to the respective display elements; a touch sensing layer including touch electrodes overlapped with the display area for touch sensing, the touch sensing layer including second interconnects overlapped with the peripheral area and connected to the respective touch electrodes; and a spacer layer interposed at least between the first interconnects and the second interconnects, wherein each of the touch electrodes and a corresponding one of the display elements closest thereto are away from each other by a first distance in a thickness direction, each of the second interconnects and a corresponding one of the first interconnects closest thereto are away from each other by a second distance in the thickness direction, and the second distance is larger than the first distance.

The spacer layer may keep the second interconnects away from the first interconnects, curbing increase in capacity and preventing lower sensitivity of the touch censor.

DETAILED DESCRIPTION OF THE INVENTION

Figure 1:
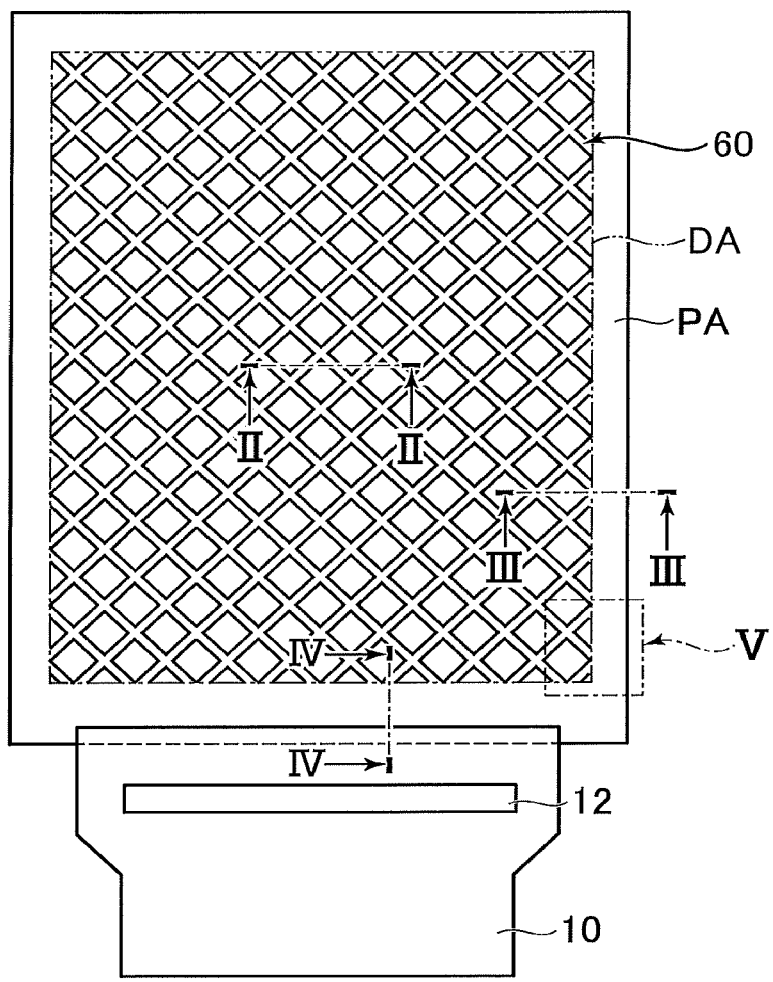
FIG. 1 is a plan view of a display device in accordance with an embodiment.

Hereinafter, embodiments will be described with reference to the drawings. Here, the invention can be embodied according to various aspects within the scope of the invention without departing from the gist of the invention and is not construed as being limited to the content described in the embodiments exemplified below.

The drawings are further schematically illustrated in widths, thickness, shapes, and the like of units than actual forms to further clarify description in some cases but are merely examples and do not limit interpretation of the invention. In the present specification and the drawings, the same reference numerals are given to elements having the same functions described in the previously described drawings and the repeated description will be omitted.

Further, in the detailed description, "on" or "under" in definition of positional relations of certain constituents and other constituents includes not only a case in which a constituent is located just on or just under a certain constituent but also a case in which another constituent is interposed between constituents unless otherwise mentioned.

FIG. 1 is a plan view of a display device in accordance with an embodiment. The display device is an organic electroluminescence display device. The display device is configured to display a full-color image in full-color pixels, each of which consists of combination of unit pixels (sub-pixels) of colors such as red, green, and blue. The display device includes a display area DA and a peripheral area PA around the display area DA. The peripheral area PA is outside the display area DA. A flexible printed circuit board 10 is connected to the peripheral area PA. On the flexible printed circuit board 10 is mounted an integrated circuit chip 12 for driving elements to display the image.

Figure 2:
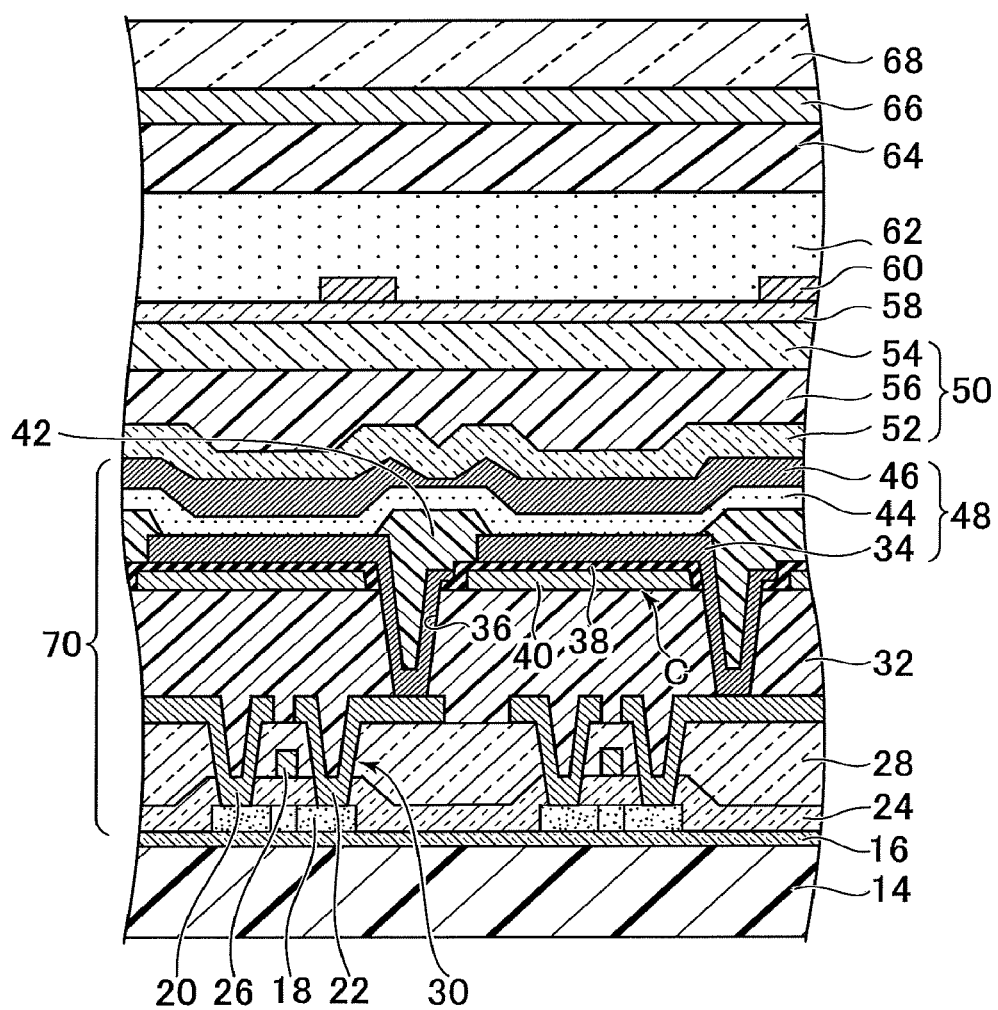
FIG. 2 is an enlarged view of a portion of II-II line cross section of the display device in FIG. 1.

FIG. 2 is an enlarged view of a portion of II-II line cross section of the display device in FIG. 1. A substrate 14 may be made from a polyimide resin or polyethylene terephthalate, having flexibility. The substrate 14 has an underlying insulating film 16 formed thereon for a barrier against impurities contained therein. The underlying insulating film 16 may be a silicon oxide film or a silicon nitride film or may be a laminate structure thereof.

On the underlying insulating film 16 is a semiconductor layer 18. The semiconductor layer 18 is electrically connected to a source electrode 20 and a drain electrode 22. The semiconductor layer 18 is covered with a gate insulation film 24. On the gate insulation film 24 is a gate electrode 26, which is covered with an interlayer dielectric 28. The source electrode 20 and the drain electrode 22 penetrate the gate insulation film 24. The source electrode 20 and the drain electrode 22 in the display area DA are just on the interlayer dielectric 28 and penetrate the interlayer dielectric 28.

The semiconductor layer 18, the source electrode 20, the drain electrode 22, the gate electrode 26, and the gate insulation film 24 constitute at least part of a thin film transistor 30. The thin film transistor 30 is in the display area DA. The gate electrode 26 in the display area DA is just on the gate insulation film 24. The thin film transistor 30 is covered with a planarization film 32. The planarization film 32 is formed from an organic material such as a polyimide resin or a photosensitive acrylic resin.

On the planarization film 32 is a plurality of pixel electrodes 34 (e.g. anodes) for the respective unit pixels (sub-pixels). The pixel electrode 34 has a laminate structure of an electrode film and a light reflective film. The pixel electrode 34 is electrically connected to one of the source electrode 20 and the drain electrode 22 on the interlayer dielectric 28 through a contact hole 36 penetrating the planarization film 32.

The pixel electrode 34 is also one electrode of a capacitor C, which is configured to include the pixel electrode 34, a capacity electrode 38 thereunder, and a dielectric insulation film 40 between the pixel electrode 34 and the capacity electrode 38. The capacitor C holds a signal for controlling a current to be supplied to the pixel electrode 34.

On the pixel electrode 34 is an insulation layer 42, which may be made from a polyimide resin or an acrylic resin. The insulation layer 42 is on the pixel electrode 34 at its periphery and is configured to expose a portion (e.g. central portion) of the pixel electrode 34. The insulation layer 42 constitutes a bank around the portion of the pixel electrode 34.

On the plurality of pixel electrodes 34 is an organic electroluminescence layer 44. The organic electroluminescence layer 44 includes a hole injection layer, a hole transport layer, light emitting layers, an electron transport layer, and an electron injection layer. The light emitting layers are individually disposed (separated) from one another for the respective pixel electrodes 34 to emit light in blue, red, or green in the respective pixels. The color of each pixel is not limited thereto and may be yellow or white. Some layers included in the organic electroluminescence layer 44, except for the light emitting layers, entirely cover the display area DA (FIG. 1) to cover the plurality of pixels. In such a case, the organic electroluminescence layer 44 is continuous on the insulation layer 42 as well.

On the organic electroluminescence layer 44 is a common electrode 46 (e.g. cathode). The common electrode 46 is on the insulation layer 42, which is the bank. The pixel electrode 34 and the common electrode 46 with the organic electroluminescence layer 44 therebetween constitute at least part of light emitting elements 48. The organic electroluminescence layer 44 lies between the pixel electrode 34 and the common electrode 46 and emits light with its brightness controlled by a current flowing through them. The light emitting elements 48 are in the display area DA and are driven with the respective thin film transistors 30. The capacitor C is provided for each of the light emitting elements 48.

The organic electroluminescence layer 44 is sealed with a sealing film 50 to be blocked from moisture. The light emitting elements 48 are sealed with the sealing film 50. The sealing film 50 has a structure where at least one organic layer 56 made from a material such as a resin is interposed between a pair of inorganic layers 52, 54 made from material such as silicon nitride. The sealing film 50 covers the display area DA (FIG. 1).

On the sealing film 50 is laminated some touch electrodes 60 for touch sensing with an insulation film interposed therebetween. An organic protective film 64, circularly polarizing plate 66, and a cover glass 68 are laminated to cover the touch electrodes 60, by means of an adhesive layer 62.

Figure 3:
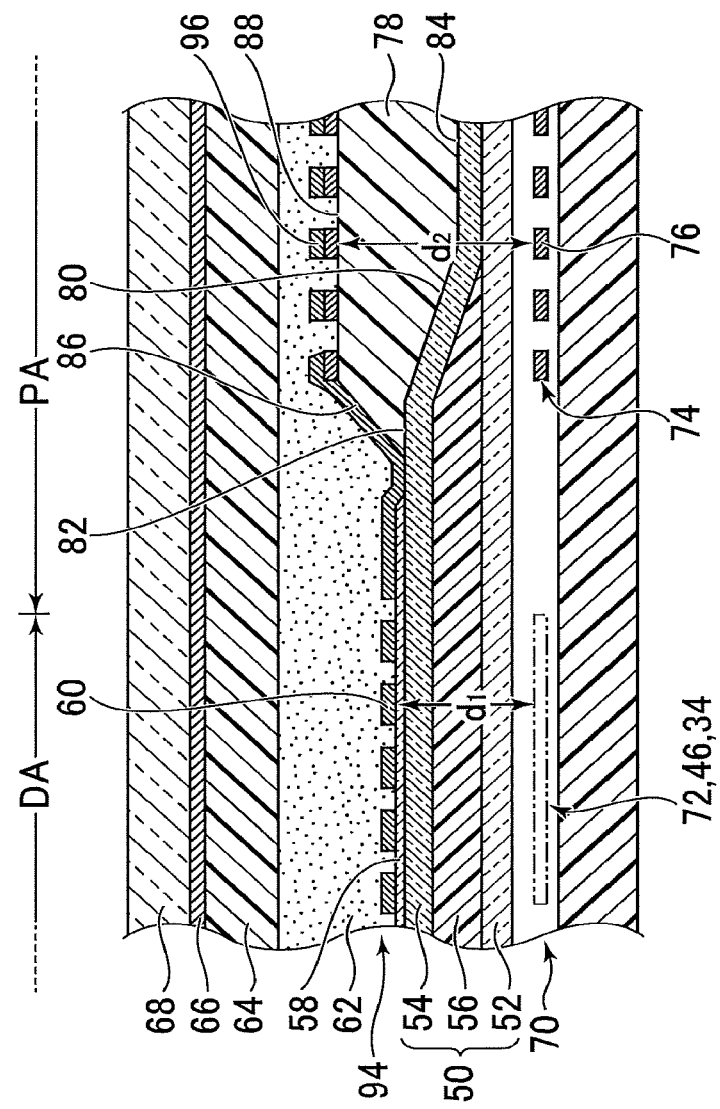
FIG. 3 is an enlarged view of a portion of III-III line cross section of the display device in FIG. 1.
Figure 4:
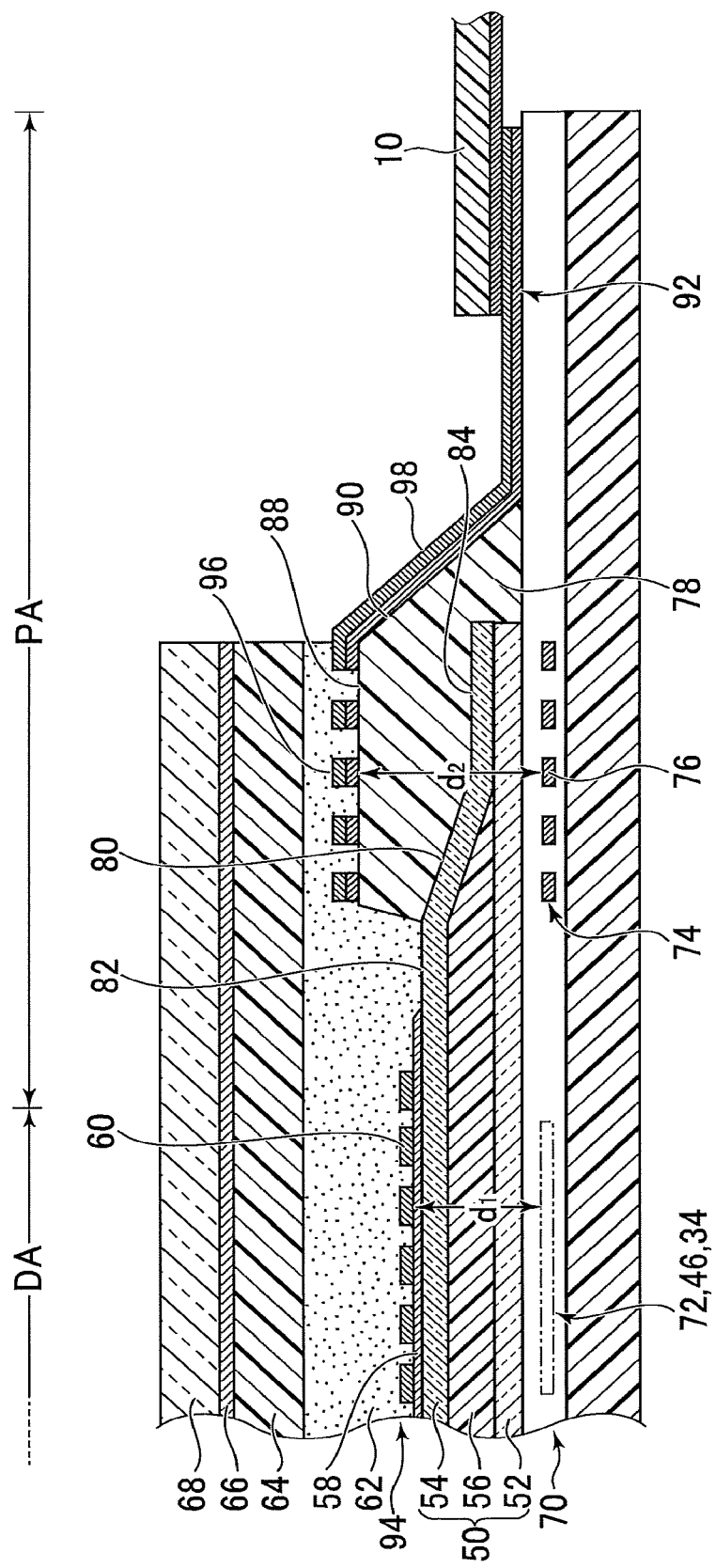
FIG. 4 is an enlarged view of a portion of IV-IV line cross section of the display device in FIG. 1.

FIG. 3 is an enlarged view of a portion of III-III line cross section of the display device in FIG. 1. FIG. 4 is an enlarged view of a portion of IV-IV line cross section of the display device in FIG. 1.

The display device includes a circuitry layer 70. The circuitry layer 70 includes the organic electroluminescence layer 44 in FIG. 2 and some display elements 72 for image display in the display area DA. The display elements 72 include the common electrode 46 and the plurality of pixel electrodes 34 over and under the organic electroluminescence layer 44, respectively (FIG. 2). The sealing film 50 seals the display elements 72. The circuitry layer 70 in the peripheral area PA includes some first interconnects 74 connected to the respective display elements 72. The first interconnects may include a common line 76 connected to the common electrode 46, a signal line, a scan line, a power line, and a ground line.

A spacer layer 78 is provided at least in the peripheral area PA. In this embodiment, the spacer layer is provided only in the peripheral area PA, not in the display area DA. The spacer layer 78 is on the sealing film 50. The sealing film 50 is made thinner at its periphery where no organic layer 56 is provided because the pair of inorganic layers 52, 54 are in contact with each other above and below around the interposed organic layer 56. The organic layer 56 of the sealing film 50 has a thickness smaller at a position closer to its periphery and has its upper surface sloping downward in an outer direction. Accordingly, an upper surface of the sealing film 50 also includes a slope section 80 where the upper surface slopes downward in the outer direction. The upper surface of the sealing film 50 includes an inner flat section 82 surrounded with the slope section 80. The upper surface of the sealing film 50 includes an outer flat section 84 around the slope section 80. The outer flat section 84 consists of part (without the organic layer 56) of the sealing film 50 (inorganic layers 52, 54 in contact above and below).

As shown in FIG. 3, an upper surface of the spacer layer 78 includes an inner slope section 86 sloping upward in the outer direction from the inner flat section 82 of the sealing film 50. The inner slope section 86 at least its end portion overlaps with the inner flat section 82 of the sealing film 50, overlaps with a boundary between the inner flat section 82 and slope section 80 of the sealing film 50, and overlaps with the slope section 80 of the sealing film 50. The upper surface of the spacer layer 78 includes a flat section 88 outside the inner slope section 86. The flat section 88 does not overlap with the inner flat section of the sealing film 50 but overlaps with the slope section 80 and the outer flat section 84.

As shown in FIG. 4, the upper surface of the spacer layer 78 includes an outer slope section 90 sloping downward in the outer direction from the flat section 88. The outer slope section 90 overlaps with the outer flat section 84 of the sealing film 50. The outer slope section 90 extends to a position (outside the sealing film 50) where no sealing film 50 overlaps. The outer slope section 90 is formed only on a side where an external terminal portion 92 is provided (e.g. on a side where the flexible printed circuit board 10 is connected). Specifically, the outer slope section 90 is formed only on a side where a connection line 98 on the spacer layer 78 extends beyond the spacer layer 78 and to an area where no spacer layer 78 is provided.

The display device has a touch sensing layer 94. The touch sensing layer 94 includes some touch electrodes 60 for touch sensing to overlap with the display area DA. The touch sensing layer 94 includes some second interconnects 96 connected to the respective touch electrodes 60 and overlapping with the peripheral area PA. The second interconnects 96 in FIG. 3 extend in a direction (front and back directions of FIG. 3) toward the terminal portion 92 in FIG. 4 (e.g. connection portion to the flexible printed circuit board 10). In contrast, the second interconnects 96 in FIG. 4 on the outer slope section 90 include a connection line 98 to be connected to the flexible printed circuit board 10.

A spacer layer 78 is interposed at least between the first interconnects 74 and the second interconnects 96. Each of the touch electrodes 60 and a corresponding one of the display elements 72 closest thereto is away from each other by a first distance d1 in a thickness direction. Each of the touch electrodes 60 and the common electrode 46 (FIG. 2) may be away from each other by the first distance d1 in the thickness direction. Each of the second interconnects 96 and a corresponding one of the first interconnects 74 closest thereto are away from each other by a second distance d2 in the thickness direction. Each of the second interconnects 96 and the common line 76 may be away from each other by the second distance d2 in the thickness direction. The spacer layer 78 makes the second distance d2 larger than the first distance d1.

Figure 5:
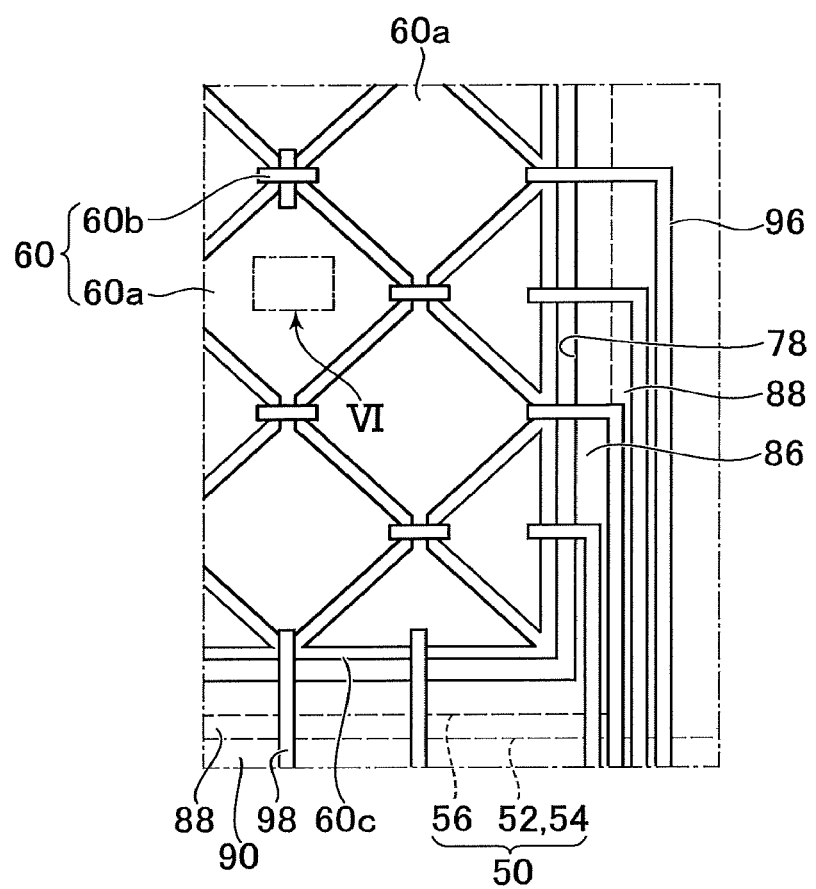
FIG. 5 is an enlarged view of a portion indicated by V in FIG. 1.

FIG. 5 is an enlarged view of a portion indicated by V in FIG. 1. The touch electrodes 60 include a first touch electrode layer 60a for electrodes to both transmit and receive touch sensing signals and include a second touch electrode layer 60b for jumper lines, with a touch censor interlayer dielectric 60c interposed therebetween.

Figure 6:
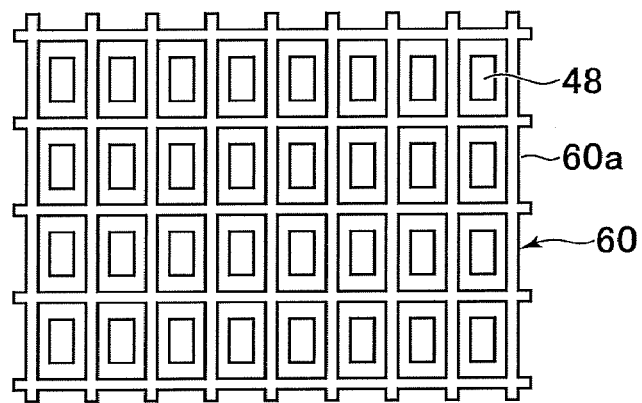
FIG. 6 is an enlarged view of a portion indicated by VI in FIG. 5.

FIG. 6 is an enlarged view of a portion indicated by VI in FIG. 5. The touch electrodes 60 are in a mesh shape. Specifically, the first touch electrode layer 60a, which is made from opaque, conductive material such as metal, stays away from light emitting regions of the light emitting elements 48, not to block outgoing light from the light emitting elements 48.

As shown in FIG. 5, the first touch electrode layer 60a is connected to the second interconnects 96. The sealing film 50 protrudes from the touch censor interlayer dielectric 60c; specifically, the inorganic layers 52, 54 have their edges outside the organic layer 56. The spacer layer 78 lies on and outside an end portion of the sealing film 50. In the peripheral area PA of this embodiment, the second interconnects 96 extend from the touch electrode 60, across the inner slope section 86 of the spacer layer 78, and onto the flat section 88. On a side where the flexible printed circuit board 10 in FIG. 1 is provided, the second interconnects 96 (connection lines 98) extend from the flat section 88, across the outer slope section 90, and onto the flexible printed circuit board 10 to be connected.

According to the embodiment, the spacer layer 78 makes the second interconnects 96 spaced apart from the first interconnects 74, curbing increase in capacity and preventing lower sensitivity of the touch censor.

[Variation]

Figure 7:
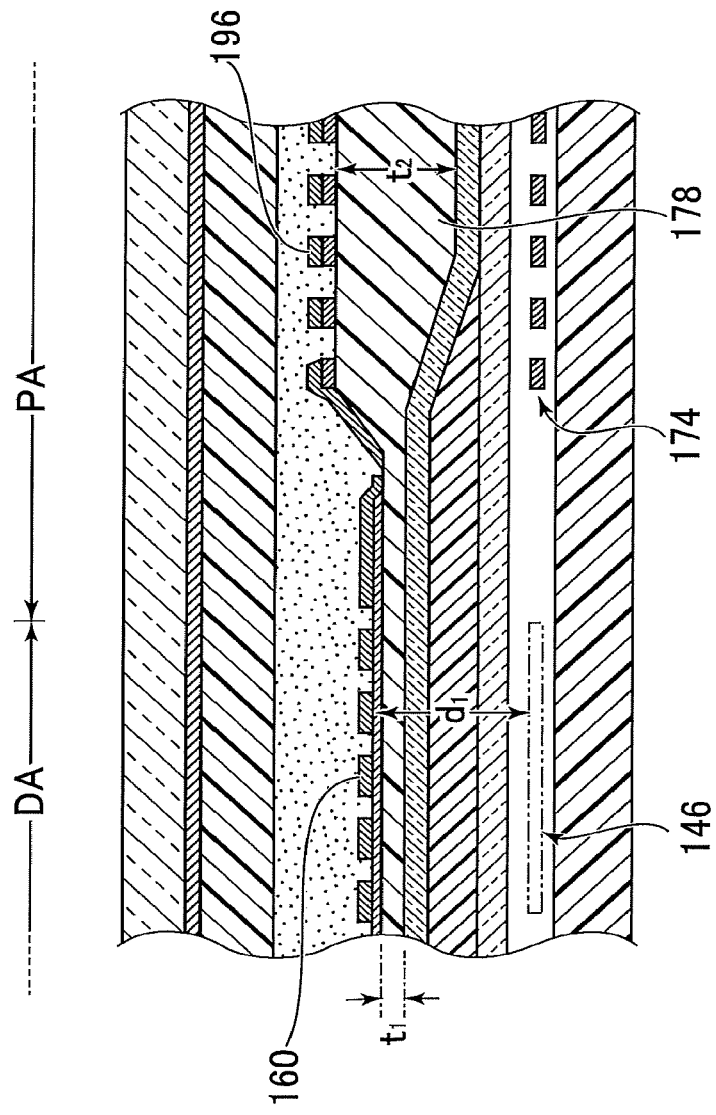
FIG. 7 is a diagram of a variation of the display device in FIG. 3.
Figure 8:
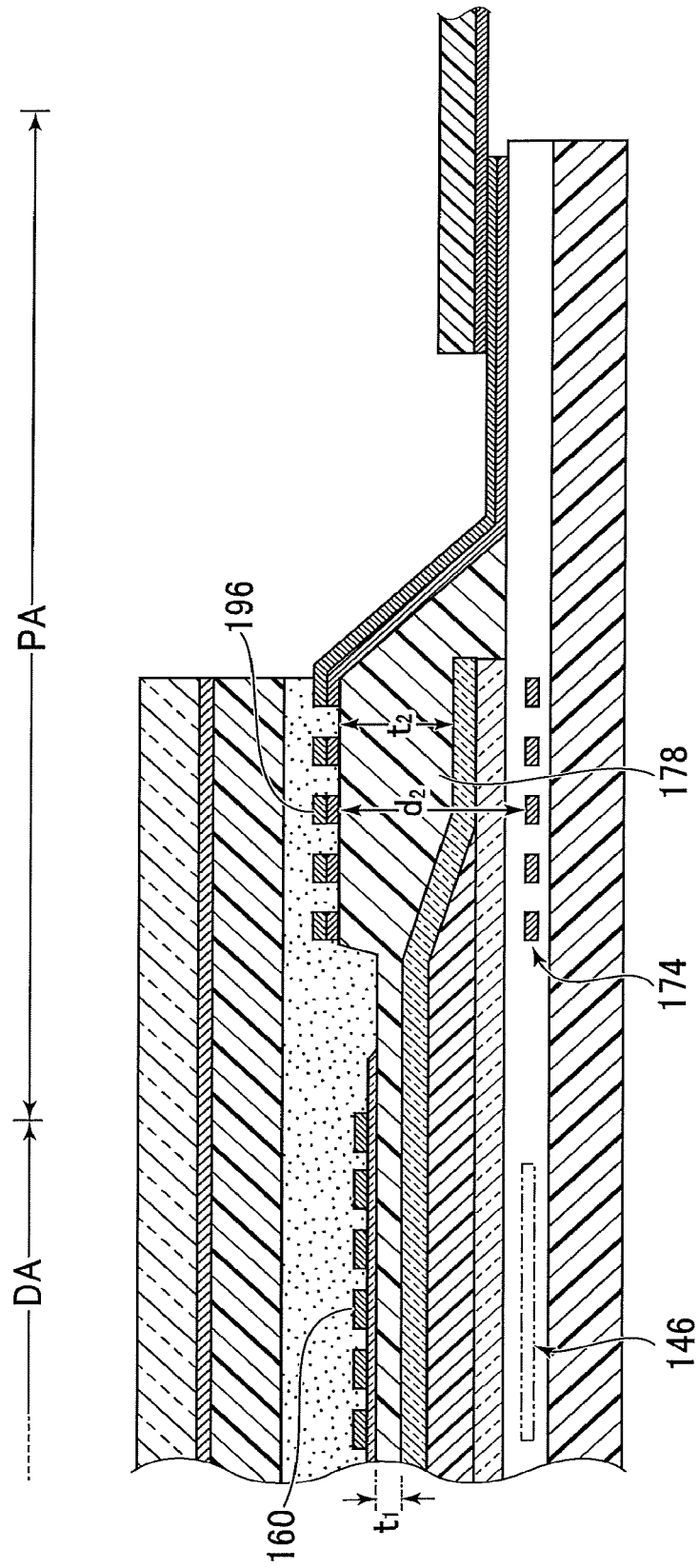
FIG. 8 is a diagram of a variation of the display device in FIG. 4.

FIG. 7 is a diagram of a variation of the display device in FIG. 3. FIG. 8 is a diagram of a variation of the display device in FIG. 4. In the variation, the spacer layer 178 has optical transparency and extends to the display area DA. The spacer layer 178 in the display area DA has a first thickness t1. The spacer layer 178 in the peripheral area PA has a second thickness t2. The second thickness t2 is a thickness of the spacer layer 178 at a position where the above-mentioned second distance d2 is measured (e.g. above the first interconnects 174). The second thickness t2 is larger than the first thickness t1. Accordingly, the second distance d2 in the peripheral area PA in FIG. 8, between the second interconnect 196 on the spacer layer 178 and the first interconnect 174, is larger than the first distance d1 in the display area DA, between the touch electrode 160 on the spacer layer 178 and the common electrode 146. Other features in the variation, which include operation and effect, can be derived from the description in the embodiment.

The display device is not limited to the organic electroluminescence display device but may be a display device with a light-emitting element disposed in each pixel, such as a quantum-dot light-emitting diode (QLED), or a liquid crystal display device.

While there have been described what are at present considered to be certain embodiments, it will be understood that various modifications may be made thereto, and it is intended that the appended claims cover all such modifications as fall within the true spirit and scope of the invention.

What is claimed is:
1. A display device comprising:
a circuitry layer including a display area and a peripheral area outside the display area, the circuitry layer in the display area including display elements for image display, the circuitry layer in the peripheral area including first interconnects connected to the respective display elements;
a touch sensing layer including touch electrodes overlapped with the display area for touch sensing, the touch sensing layer including second interconnects overlapped with the peripheral area and connected to the respective touch electrodes; and
a spacer layer interposed at least between the first interconnects and the second interconnects,
wherein
each of the touch electrodes and a corresponding one of the display elements closest thereto are away from each other by a first distance in a thickness direction,
each of the second interconnects and a corresponding one of the first interconnects closest thereto are away from each other by a second distance in the thickness direction, and
the second distance is larger than the first distance.
2. The display device according to claim 1,
further comprising a sealing film for sealing the display elements,
wherein the spacer layer is on the sealing film.
3. The display device according to claim 1, wherein the spacer layer is in the peripheral area.
4. The display device according to claim 1, wherein the spacer layer has optical transparency and extends from the peripheral area to the display area.
5. The display device according to claim 4, wherein the spacer layer has a first thickness in the display area and a second thickness in the peripheral area, and the second thickness is larger than the first thickness.

6. The display device according to claim 1, wherein
the circuitry layer includes an electroluminescence layer,
the display elements include a plurality of pixel electrodes under the electroluminescence layer and a common electrode over the electroluminescence layer, and
each of the touch electrodes and the common electrode are away from each other by the first distance in the thickness direction.

7. The display device according to claim 6, wherein
the first interconnects include a common line connected to the common electrode, and
each of the second interconnects and the common line are away from each other by the second distance in the thickness direction.

* * * * *